(12) United States Patent
Said (10) Patent No.: US 12,116,738 B2
(45) Date of Patent: Oct. 15, 2024

(54) LONG SPAN BRIDGE DESIGNS

(71) Applicant: AEEE Capital Holding & Advisory Group, Irvine, CA (US)

(72) Inventor: Mohamed J. Said, Irvine, CA (US)

( * ) Notice: Subject to any disclaimer, the term of this patent is extended or adjusted under 35 U.S.C. 154(b) by 692 days.

(21) Appl. No.: 17/398,090

(22) Filed: Aug. 10, 2021

(65) Prior Publication Data

US 2022/0205195 A1 Jun. 30, 2022

Related U.S. Application Data

(63) Continuation-in-part of application No. 17/136,695, filed on Dec. 29, 2020, now abandoned.

(51) Int. Cl.
*E01D 2/02* (2006.01)
*C04B 14/06* (2006.01)
(Continued)

(52) U.S. Cl.
CPC ............. *E01D 2/02* (2013.01); *C04B 14/06* (2013.01); *C04B 14/28* (2013.01);
(Continued)

(58) Field of Classification Search
CPC ......... E01D 2/02; E01D 2/04; E01D 2101/28; E01D 2/00; E01D 2101/262;
(Continued)

(56) References Cited

U.S. PATENT DOCUMENTS

| | | | | |
|---|---|---|---|---|
| 1,153,411 A | * | 9/1915 | Wuczkowski | ............ E04C 3/34 |
| | | | | 52/690 |
| 3,906,687 A | * | 9/1975 | Schupack | ............... E01D 19/02 |
| | | | | 52/378 |

(Continued)

*Primary Examiner* — Abigail A Risic
(74) *Attorney, Agent, or Firm* — Gugliotta & Gugliotta, LPA (57) ABSTRACT

A precast concrete beam A beam for use in construction of a long span bridge structure comprising:
a reinforcing member having a geometric configuration selected from a group consisting of: a "U" tub beam with composite deck system; a decked I-beam; and an adjacent box beam;
said geometric configuration formed of a UHPC mix having:
an initial compressive strength, $f'_{ci}=10.0$ ksi;
a compressive strength at service, $f'_c=17.4$ ksi;
a modulus of elasticity of concrete, $E_c=6500$ ksi;
a residual rupture stress, $f_{rr}=0.75$ ksi; and
a concrete unit weight, $w_c=0.155$ kcf; and
said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer.

21 Claims, 9 Drawing Sheets

(51) Int. Cl.
  *C04B 14/28* (2006.01)
  *C04B 20/00* (2006.01)
  *C04B 28/04* (2006.01)
  *C04B 28/06* (2006.01)
  *C04B 28/08* (2006.01)
  *C04B 40/06* (2006.01)
  *C04B 103/56* (2006.01)
  *E01D 101/26* (2006.01)
  *E01D 101/28* (2006.01)

(52) U.S. Cl.
  CPC .......... *C04B 20/0048* (2013.01); *C04B 28/04* (2013.01); *C04B 28/06* (2013.01); *C04B 28/08* (2013.01); *C04B 40/0625* (2013.01); *C04B 2103/58* (2013.01); *E01D 2101/262* (2013.01); *E01D 2101/266* (2013.01); *E01D 2101/28* (2013.01)

(58) Field of Classification Search
  CPC ... E01D 2101/266; E01D 19/02; B28B 23/06; E04C 5/073; E04C 5/08
  See application file for complete search history.

(56) References Cited

U.S. PATENT DOCUMENTS

| | | | |
|---|---|---|---|
| 4,185,440 A * | 1/1980 | Finsterwalder | B28B 23/046 29/469 |
| 4,912,896 A * | 4/1990 | Shamsai | E04C 3/26 52/432 |
| 6,557,201 B1* | 5/2003 | Bowman | E01D 15/133 14/78 |
| 6,751,821 B1* | 6/2004 | Han | E04C 3/26 52/223.8 |
| 6,753,081 B1* | 6/2004 | Lovett | C04B 16/0625 428/362 |
| 7,475,446 B1* | 1/2009 | He | E01D 2/04 52/223.7 |
| 8,020,235 B2* | 9/2011 | Grace | E01D 2/02 14/78 |
| 8,316,495 B2* | 11/2012 | He | E04B 5/046 52/223.7 |
| 8,650,819 B2* | 2/2014 | Yegge | E04C 3/26 52/223.13 |
| 9,309,634 B2* | 4/2016 | Grace | E01D 2/02 |
| 9,890,505 B2* | 2/2018 | Shamsai | E01D 2/02 |
| 9,988,775 B1* | 6/2018 | Garber | E01D 2/02 |
| 2005/0000186 A1* | 1/2005 | Van Erp | E01D 2/00 52/741.1 |
| 2006/0272267 A1* | 12/2006 | Mentado-Duran | E04C 3/26 52/693 |
| 2007/0056123 A1* | 3/2007 | Moon | E01D 2/02 14/77.1 |
| 2009/0241452 A1* | 10/2009 | Hillman | E01D 2/02 52/843 |
| 2009/0288355 A1* | 11/2009 | Platt | E04C 3/294 52/223.13 |
| 2010/0064454 A1* | 3/2010 | Grace | E01D 2/02 14/73 |
| 2010/0307081 A1* | 12/2010 | Han | E01D 2/00 52/223.7 |
| 2012/0279000 A1* | 11/2012 | Kim | E01D 2/02 14/77.1 |
| 2013/0263392 A1* | 10/2013 | Han | E01D 19/02 14/74.5 |
| 2013/0269125 A1* | 10/2013 | Grace | E01D 19/125 14/73 |
| 2014/0109325 A1* | 4/2014 | Han | E04B 5/10 14/73 |
| 2016/0305077 A1* | 10/2016 | Shamsai | E04B 5/06 |
| 2017/0191279 A1* | 7/2017 | Azizinamini | E04G 23/0211 |
| 2017/0233961 A1* | 8/2017 | Tokuno | E01D 2/02 14/73 |
| 2018/0135261 A1* | 5/2018 | Nelson | E01D 2/02 |
| 2018/0179111 A1* | 6/2018 | Fang | C04B 14/28 |
| 2018/0312445 A1* | 11/2018 | Guynn | C04B 14/28 |
| 2019/0309488 A1* | 10/2019 | Li | E01D 19/067 |
| 2019/0316305 A1* | 10/2019 | Thavamani Pandi | E04C 3/294 |
| 2020/0331805 A1* | 10/2020 | Guynn | C04B 28/006 |
| 2021/0229319 A1* | 7/2021 | Royce | E04B 5/06 |

* cited by examiner

LONG SPAN BRIDGE DESIGNS

RELATED APPLICATIONS

The present application is a Continuation in Part of U.S. application Ser. No. 17/136,695 filed on Dec. 29, 2020 and incorporated by reference as if fully rewritten herein.

BACKGROUND OF THE INVENTION

1. Field of the Invention

The present invention relates generally to long span bridge designs and, more particularly, to such long span bridge designs utilizing precast Ultra-High-Performance-Concrete Mix (UHPC Mix).

2. Description of the Related Art

Prestressed concrete is a structural material that allows for predetermined engineering stresses to be placed in members to counteract the stresses of loads. Conventionally, it combines the high-strength compressive properties of concrete with the high tensile strength of steel.

These prestressed concrete girder bridges are currently used in bridge construction all over the world. These bridges use long 'spans', which refer to the main span of a bridge measured by the center-to-center distance of adjacent towers, pylons, piers, or supports. The longest prestressed concrete beams manufactured successfully to date were installed in the Netherlands. The main span of the bridge over the Starkenborgh Canal in Zuidhorn, Netherlands utilizes box beams that are 223 feet long and 480,000 pounds.

In many instances utilizing longer spans would result in improved performance and overall cost savings. The need for fewer towers, pylons, piers, or supports would decrease installation time and construction cost. Similarly, the installation of fewer, but longer beam spans would also enhance these benefits. However, while the need for longer beam spans has long existed, current systems lack designs, materials and methods of construction in order to achieve this longstanding need.

Consequently, the development of improved long span bridge designs, as well as the creation of improved materials and methods for their construction, would be greatly beneficial.

SUMMARY OF THE INVENTION

It is thus an object of the present invention to provide improved precast concrete beam designs particularly adapted for long span use in the construction of bridges or the like.

It is a feature of the present invention to provide such beam designs implemented utilizing a novel UHPC[1] mix.

[1] UHPC is a general term used for ultra-high-strength-concrete or similar: EA SUPER STRENGTH CONCRETE MIX™ ("EASSCM") is the UHPC mix of the present invention and provided under license by EA Precast Concrete Products & Services, LLC of Westlake Ohio.

Briefly described according to the present invention, four different ultra-high-performance concrete (UHPC) bridge system designs are provided that are structurally sound, more expeditious to build and significantly cheaper than current traditional systems. According to a first aspect of the present invention a "U" tub beam with composite deck system is provided that spans 350 feet. According to a second aspect of the present invention, a decked I-beam is provided that spans 350 feet. According to a third aspect of the present invention an adjacent box beam system is provided that spans in excess of 230 feet. And, according to a fourth aspect of the present invention a decked I-beam is provided that spans 250 ft. These systems are then compared with a typical or similar system, then to conventional systems. In each aspect of the present invention the creation of prestressed concrete beams is made with a novel UHPC mix (EASSCM) having: initial compressive strength, $f'_{ci}$=10.0 ksi; compressive strength at service, $f'_c$=17.4 ksi; modulus of elasticity of concrete, $E_c$=6500 ksi; residual rupture stress, $f_{rr}$=0.75 ksi; and concrete unit weight, $w_c$=0.155 kcf It is an advantage of the present invention to provide precast bridge beams capable of spans ranging from about 250 feet to about 350 feet in length.

It is another advantage of the present invention to improve the sustainability of the end use infrastructure, with useful lifespans increasing to 300+ year (as compared to 100+ year life for traditional concrete structures), resulting from greater resistance to oxidation, resistant to environmental degradation, and greater impenetrability to moisture and air.

It is yet another advantage of the present invention to provide for significantly less expensive structures, with (38-42%) immediate savings of between 38-42% plus additional savings on long term service and maintenance.

It is yet another advantage of the present invention to allow for quicker installation resulting from fewer intermediary support locations, thereby reducing the cost for the support itself and savings on utility re-work, shoring, de-watering, etc.

It is yet another advantage of the present invention to provide for beam components that are almost half the weight of conventional concrete beams, thereby providing for easer handling and transportation.

It is yet another advantage of the present invention to eliminate the need for conventional steel reinforcing or stirrups a It is yet another advantage of the present invention to provide structural elements that are inherently more fire resistant.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, four different ultra-high-performance concrete (UHPC) bridge system designs are provided that are structurally sound, more expeditious to build and significantly cheaper than current traditional systems. Throughout the various designs, a UHPC mix is provided according to Table 1.

TABLE 1

UHPC Mix Design

| Material | Quantity |
|---|---|
| Amount per YD$^3$ | |
| Cement | 1026 pounds |
| Silica Fume | 190 pounds |
| Supplemental Material (limestone powder) | 114 pounds |
| Supplemental Material (slag) | 570 pounds |
| Masonry Sand | 1637 pounds |
| Chilled Water* | 165 pounds |
| Ice* | 165 pounds |
| High-Range Water Reducer | 800 fluid ounces |
| Workability Retaining Admixture | 100-200 fluid ounces |
| Steel Fibers (Duara or equivalent) | 264 pounds |
| Water-Binder | |
| Flow Spread | Min 9 inches, just before placement in product mold |
| Min. Compressive Strength, 2-inch cubes, lab hot water cured | 25,000 psi |

*Total including moisture in the sand and water in the admixtures

Such a cementitious material provides cost and performance improvements and result in structurally sound novel bridge designs.

The composition according to this preferred embodiment meets all the material requirements of the PCI, including compressive and flexural strengths. Material properties include:

Initial compressive strength, f'ci 10.0 ksi;

Compressive strength at service, f'c 30 ksi;

Modulus of elasticity of concrete, Ecm=6500 ksi;

Residual rupture stress, frr=0.75 ksi; and

Concrete unit weight, wc=0.155 kcf.

For purposes of the present invention, the cement should be broadly considered within a range of equivalents to include a cementitious mixture of any type known suitably for concrete formation. The cement component may preferably be a Portland cement, or blended cements including mineral admixtures or blends calcium aluminate cements, calcium sulfoaluminate cements, alkali-activated binders, supersulfated slag cements. More generally, the cement component is to be broadly construed as any cement defined in the American Society for Testing and Materials ("ASTM") standard C150 for "Standard Specification for Portland Cement" or ASTM C595 for "Standard Specification for blended hydraulic cements" or in the European Committee for Standardization standard EN 197-1 for "Cement—Part 1: Composition, specifications and conformity criteria for common cements.

For purposes of the present invention, the silica fume or amorphous (non-crystalline) polymorph of silicon dioxide, and should be broadly construed as any material known by one having ordinary skill in the relevant art to equivalently fulfil ASTM standard C1240, "Standard Specification for Silica Fume Used in Cementitious Mixtures" or in the European Committee for Standardization standard EN 13263 "Silica fume for concrete."

For purposes of the present invention, the water component is preferably of a composition generally known by those having ordinary skill in the relevant art as including mixing water for concrete that may including various impurities. Water fulfilling the requirement ASTM C1602/C1602M or EN 1008:2002 or similar or equivalent standards may be used.

Figure 1:
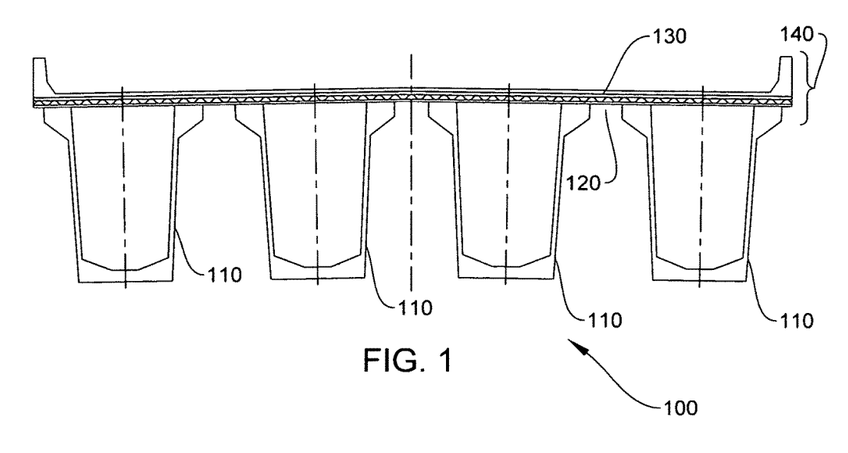
FIG. 1 is a schematic cross sectional view of a beam bridge configuration according to a U-beam configuration embodiment of the present invention.

As shown in FIG. 1 through FIG. 4, a "U" tub beam design with composite deck system, generally noted as 100, is provided. Such a design is capable of spans up to 350 feet. The 330 ft span tub beam bridge system uses four tub beams 110 that are 12 ft deep with a beam spacing of 12-ft 8-in. The system makes use of a composite stay-in-place truss panel 120 with a cast-in-place (CIP) composite deck 130. The cross-section of the bridge is shown in FIG. 1. A big advantage of the composite truss panel is that the precast UHPC portion can be placed and fit easily on top of the U-beams, eliminating the need for both the haunch and forming underneath the slab and between the beams 110. To resist a bending moment, each beam 110 may incorporate a plurality of reenforcing strands 112 within each member. According to one embodiment of the present invention, reinforcing strands 112 formed of fiber strands may be used. The use of steel fibers having diameters of between about 0.5-inch and about 2.0-inches are preferred, with the use of an about 0.7-in. diameter steel fiber strands being more preferred for certain performance specifications. The fiber strands may further have lengths of between about ½ inch to about 5 inches. Further, it is anticipated that the use of fiber strands of a polymer material may also be used instead of steel, such as polypropylene, nylon, polyvinyl alcohol, polyolefin, polyethylene, polyester, acrylic, or aramid. Further still, the use of carbon or glass fibers, such as silica glass, basalt glass or glass fiber-reinforced polymer or basalt fiber-reinforced polymer (GFRP/BFRP) may also be used.

Conventional concrete is a brittle material by nature, with a (relatively) weak performance in tension. To alter this characteristic and avoid a sudden brittle failure of concrete structures, reinforcing materials are embedded into the concrete matrix. In contrast, the present designs utilize UHPC that incorporate discontinuous fibers distributed randomly throughout the concrete matrix in order to provide a cementitious composite having improved performance in the fresh and hardened states, with improved elastic modulus, tensile strength, ultimate strain, and bonding and chemical compatibility provided to the matrix.

Figure 2:
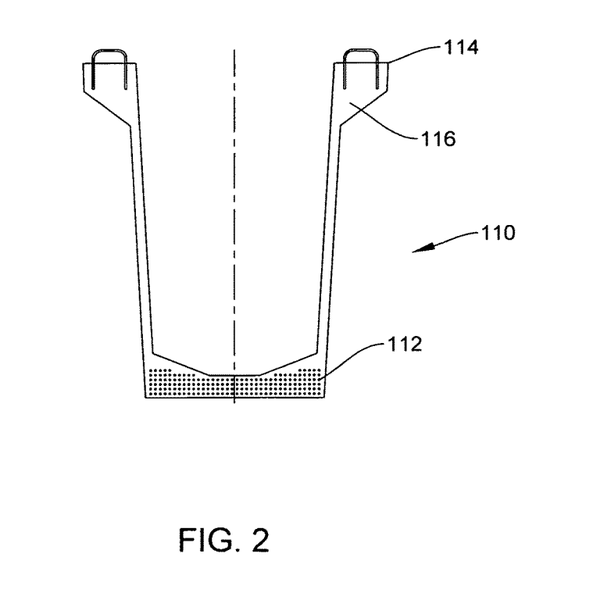
FIG. 2 is a schematic detailed cross sectional view of an individual precast U-beam configuration for use therewith.
Figure 3:
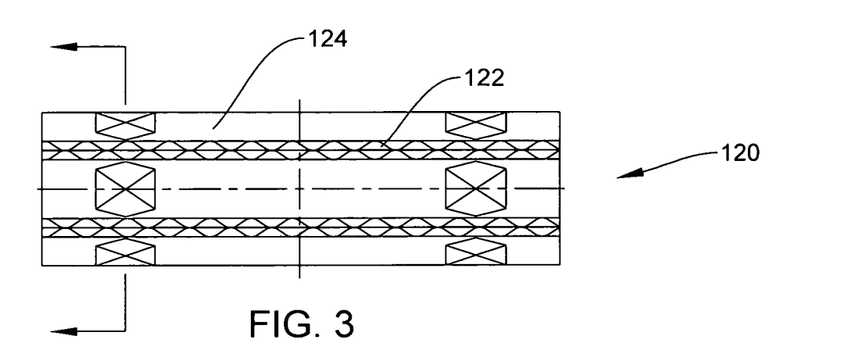
FIG. 3 is top plan view of an exemplary UHPC truss panel for use therewith.
Figure 4:
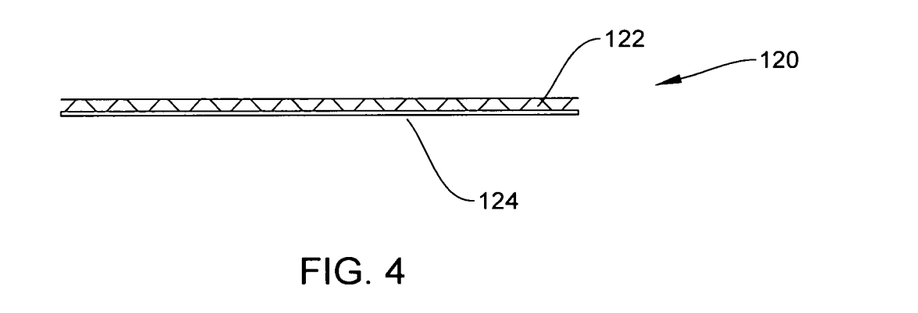
FIG. 4 is a side elevational view thereof.
Figure 5:
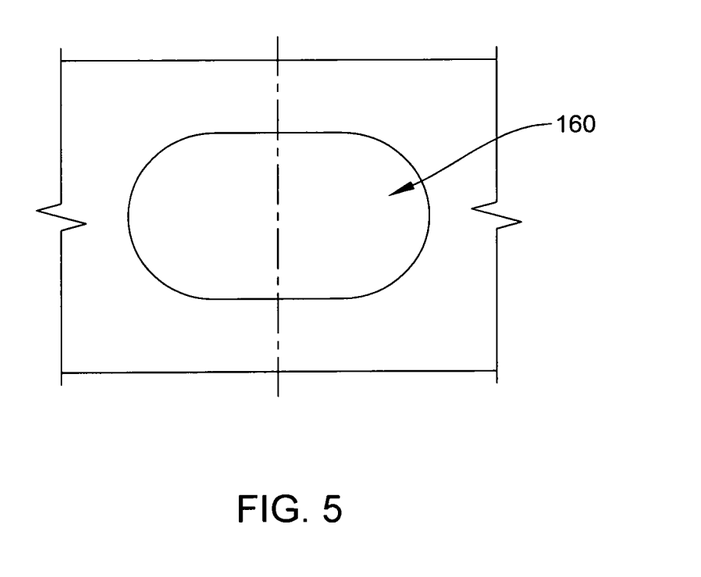
FIG. 5 is a partial detailed elevational view of the of a deck panel section forming a void.
Figure 6:
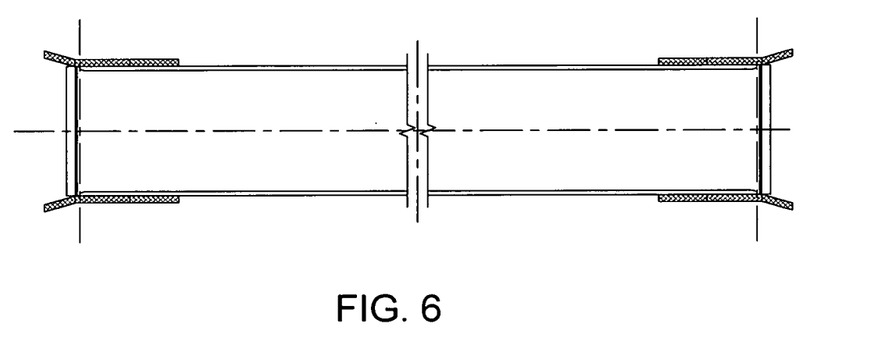
FIG. 6 is a general plan view of a bridge utilizing the beam bridge configuration according to a U-beam configuration embodiment of the present invention.

As shown best in conjunction with FIG. 2, a close-up of the cross-section of the beam 110 is shown. In order to resist interface shear demand, the incorporation of hooked bars 114 along the top of each bulb 116. Shown exemplary are the use of no. 4 grade 60 hooked bars placed at 12-in. spacing, but the hooked bars 114 may be spaced to fit inside any voids of the precast UHPC truss panel 120, thereby allowing for composite connection between the beams 110 and the top slab 140. As shown in FIGS. 3A, 3B and 4, the precast UHPC deck slab 140 consists of a 1.5-in. thick precast UHPC layer 120 with two welded wire steel trusses 122 and a conventional concrete (CC) layer 124 that is placed at time of construction.

Figure 7:
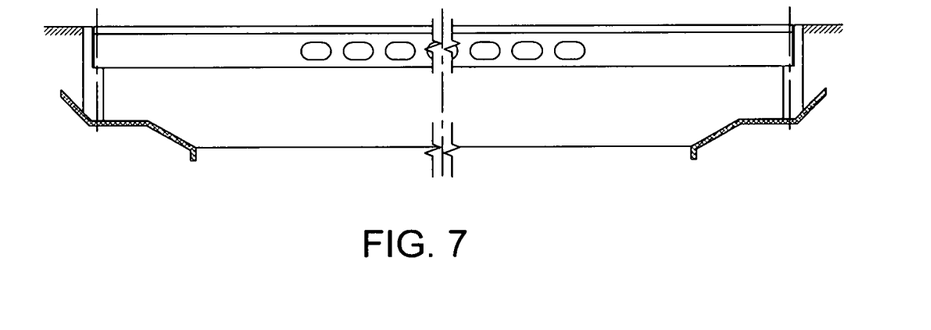
FIG. 7 is an elevational view of the bridge of FIG. 6.
Figure 8:
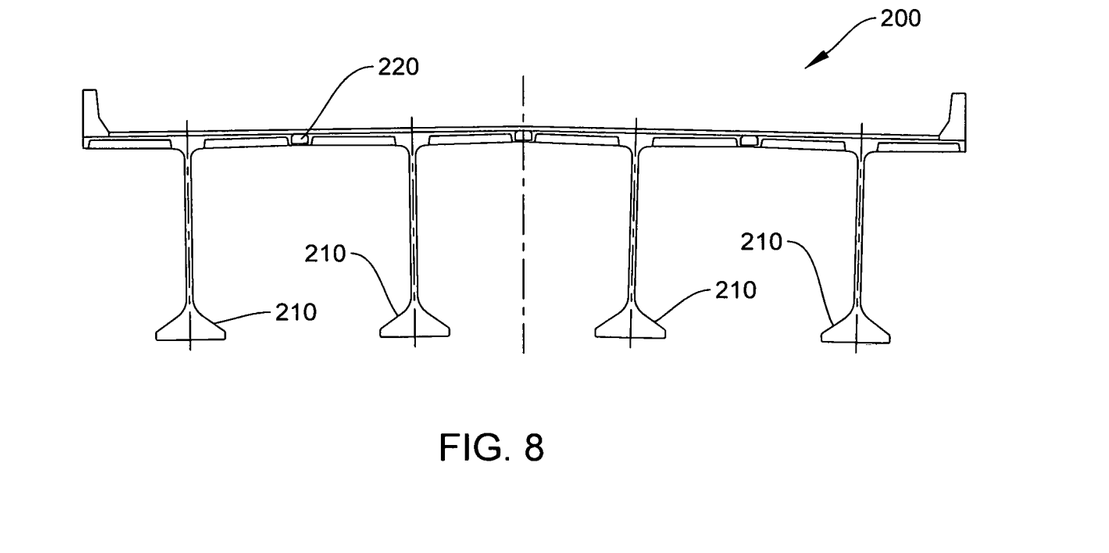
FIG. 8 is an exemplary cross sectional view of a decked I-beam ("DIB") bridge design shown according to the present invention for a design of a 350-foot span.
Figure 9A:
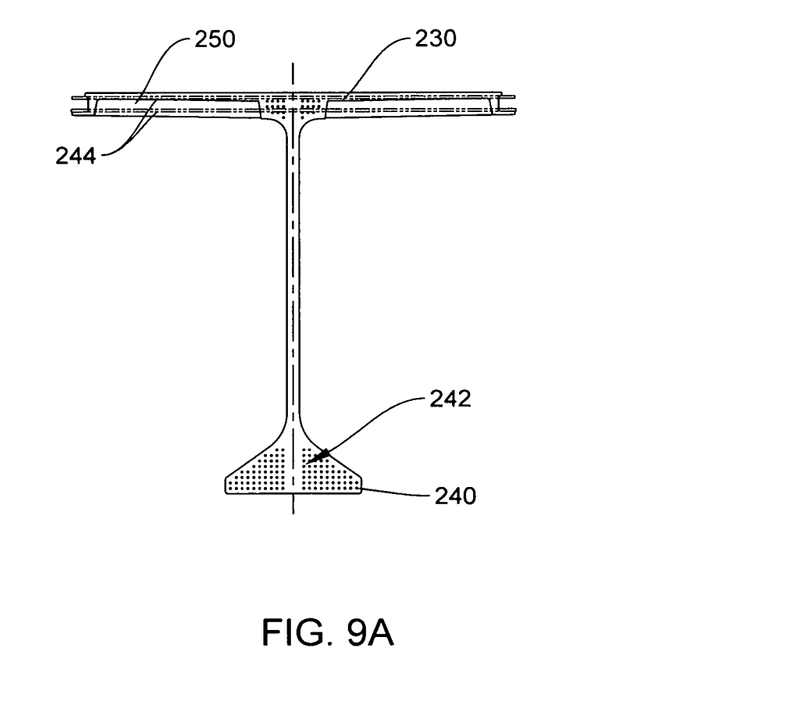
FIG. 9A is a schematic cross section view of a decked I-beam for use therewith.
Figure 9B:
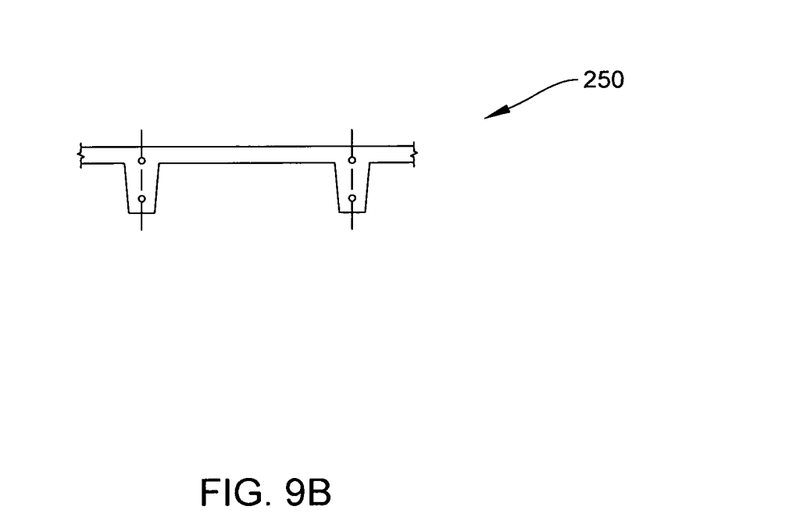
FIG. 9B is a cross section of the transfer ribs of the design of FIG. 9A.

As shown best in conjunction with FIG. 7, to further optimize the shape, the middle third of the beam configuration forms oval openings 160 may be formed instead of the steel trusses in order to optimize the section and reduce the weight. The oval openings may be at the middle two-third of the span and may include fillets at the ends to avoid stress concentration as the webs are designed and intended to not have vertical bars.

Referring to FIG. 8 through FIG. 12, an alternate design for a 350-foot bridge span is shown in a decked I-beam (DIB) bridge system 200. The system 200 may utilize a plurality, shown herein as four (4) decked I-beams 210. As shown, an exemplary configuration is provided in which the beams 21 are 12 feet in depth with a beam spacing of 12-ft 8-in. Rather than using a deck slab 150 or the shown composite truss panel 120 if the prior configuration, the deck 220 is integrated into the beam 210, allowing for simple and quick production. The deck 220 may be ribbed, as shown in conjunction with FIG. 9B, to save on material costs, as the entire depth is not needed to obtain sufficient strength and resist transverse bending. Reinforcing bars (not shown) may be placed transversely in these ribs to provide enough bending strength as well as for a joint connection.

Figure 14A:
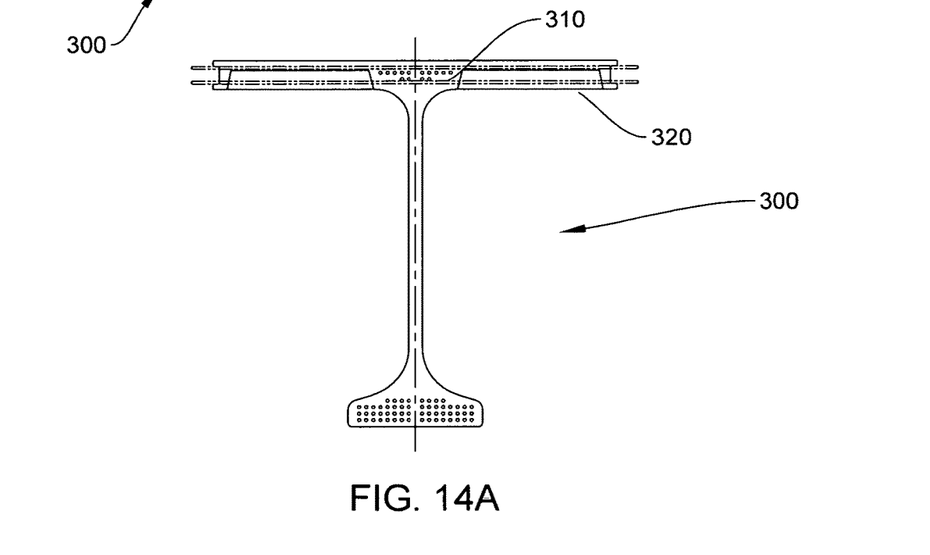
FIG. 14A is a schematic cross section view of a decked I-beam for use therewith.
Figure 14B:
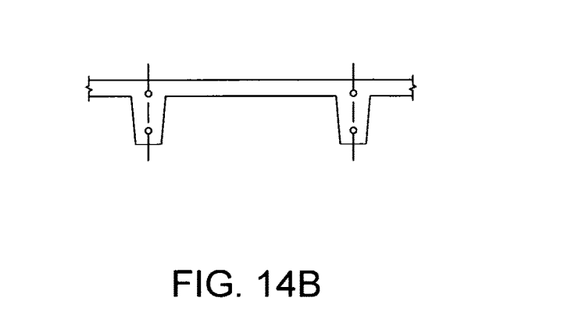
FIG. 14B is a cross section of the transfer ribs of the design of FIG. 9A.

A close-up of the cross section of the beam 210 is shown in FIG. 14A, with a cross section of the ribs 250 shown in FIG. 14B. Of note is a gap 242 between reinforcing strands 240 in the center of the beam. This allows for the UHPC to be able to flow uninterrupted to the bottom, thereby preventing any fiber bridging between center strands 240. According to one configuration, no. 6 grade 60 reinforcing bars 244 may be placed in the top and bottom of each rib 250 in order to allow for sufficient connection of the beams, as well as to resist any positive and negative bending of the integrated deck 230.

Figure 10:
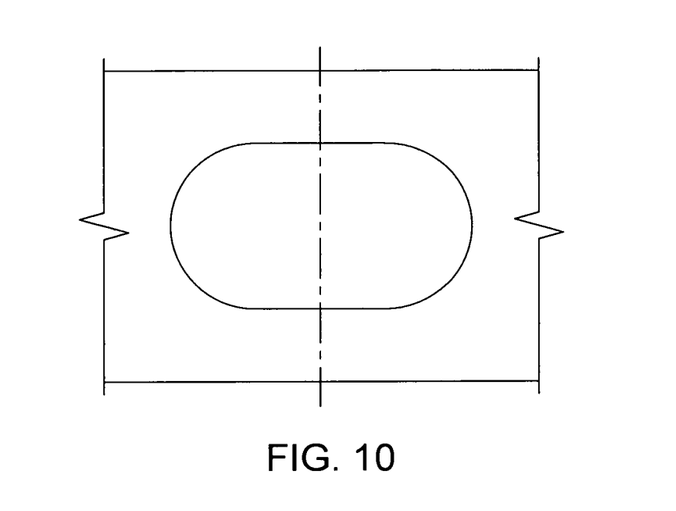
FIG. 10 is an exemplary configuration of a voided section of the DIB design.

To further optimize the shape of the bridge, the beam 200 may be formed as a truss beam 260 for the middle 60 percent of the length. As shown in FIG. 10, triangular shaped voids 242 may be formed using expanded polystyrene (EPS) or similar filler during formation. This substantially reduces both the weight of the member and the amount of material needed.

The DIB beams 210 may be subjected to very high prestressing forces at release. In such situation, to prevent cracking of the member at time of release, steel reinforcement may be provided as a bursting reinforcement by adding within a distance of h/4. For the decked I-beam, such reinforcement may be needed only at each end, where the reinforcement fibers are intended to carry the rest of the stress.

According to another aspect of the present invention a decked I-beam 300 is provided that spans 250 ft. Such a decked I-beam may be similar in style and construction as with the prior DIB design, but having different specific dimensions as shown in order to accommodate a long span of about 250 feet. This member would have similar framing to that of the 350 ft span design, but the beams are 9 ft deep and approximately 9 ft wide. Additionally, (26) holes 310 are formed placed in the top of the member to allow for in-field post-tensioning of 0.5-in. strands so that the camber can be adjusted as needed. Note that the main difference in the 350 ft span beam and the 250 ft span beam is the shape of the joint 320. The joint shape in the 350 ft span shows a joint that is easy to form for field casting where backer rod can be placed in the bottom flanges, while this beam uses a more standard detail. This beam also uses the same ribbed section as shown previously, as shown here in FIG. 12B.

Finally, in an alternate configuration an adjacent box beam 400 design is shown according to FIG. 17 through FIG. 22. Such a configuration is intended to span a little longer than the current record bridge that has a beam that has a span of 223 feet and would be capable of and intended to span sim ply supported with span lengths of 230 ft to 250 ft. The other aspects of the system are the same, with the bridge width of 50 ft and a 3 in. wearing surface 402. However, these beams 400 are only 8 ft deep for the 230 ft design and 9 ft deep for the 250 ft design. This compares to the other systems which have 12 ft deep beams. In order to achieve modularity a box beam width of 3 feet per box was selected. This system 400 makes use of 16 boxes at a spacing of approximately 3-ft 1⅝-in. To reduce the weight and material quantities, a ribbed top flange is also proposed as shown in conjunction with FI.15. Note that the transverse bars are not shown in this section for clarity. Additionally, the ends will also have a diaphragm that gives a fully encased box.

Figure 18:
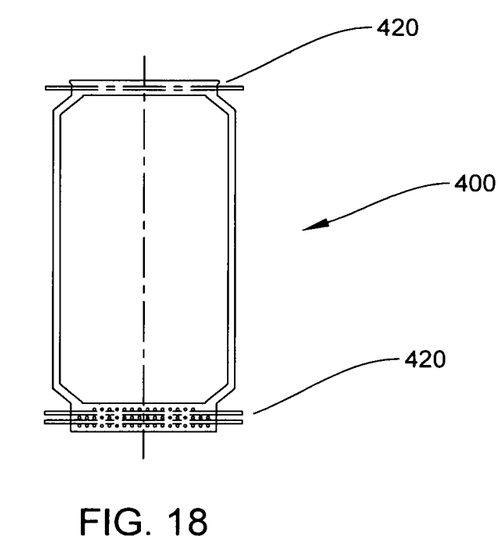
FIG. 18 is a cross section of a box beam girder for use therewith.

A close-up of the cross-section of the beam 400 is shown in FIG. 18. Reinforcing bars 420 may be placed in the top and bottom of each flange to allow for sufficient connection of the beams 400.

Figure 20:
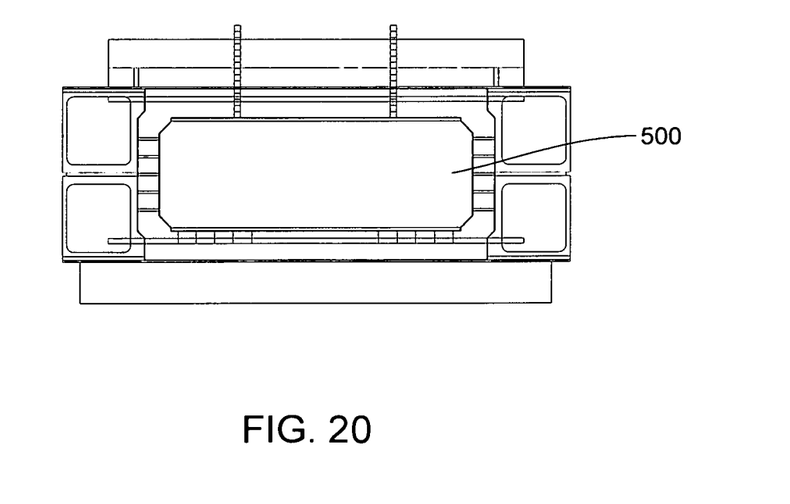
FIG. 20 is a schematic for a forming system for formation of the box beams 400.
Figure 21:
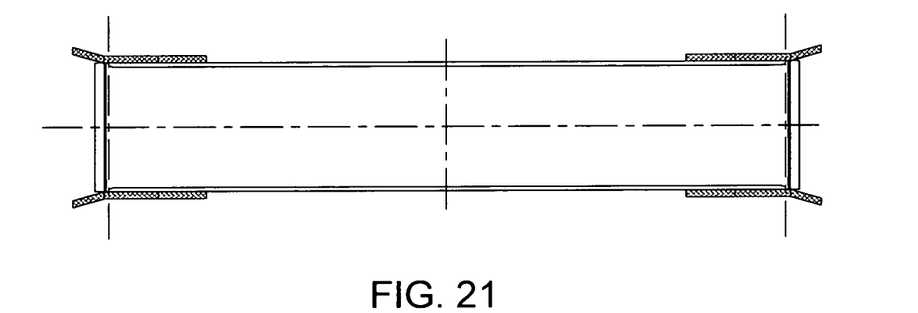
FIG. 21 is a top plan view of an exemplary long span prestressed decked I-beam incorporating the teachings of the present invention.

As shown in conjunction with FIG. 20, a system for forming the block out orifice 440 in the box beam 400 is shown. A stay-in-place expanded polystyrene block 500 may be utilized would be needed. In order create the void and to assure that the float 500 does not float or move during production, a full-depth hole (not shown) be formed in the EPS at increments along the length of the beam. This gives a spot that can be poured from if needed, but more importantly, to make sure that the concrete is fully filling the bottom flange. For this type of design, it is anticipated that the beams would not need any bursting reinforcement. The depth of the member in combination with the fibers is intended to be enough to prevent cracking. This is especially true when an end diaphragm is provided.

2. Operation of the Preferred Embodiment

In operation the beams 10 allow for use in large span surfaces 100, greater than would otherwise be attainable. The large services span may further be achieved with additional support. The overall strength added by the diaphragms 30 also provide additional support for the horizontal planar support 18.

Further, it is anticipated that the beams 10 may be precast off-site from a final installation. As such they may be preformed as a prestressed structure.

It should be apparent to those having ordinary skill in the relevant art, in light of the present teachings, that a number of modifications and variations may exist to the configuration(s) described. It should also be understood that utilizing an effective long span, wide flanged, prestressed girder may be provided for the construction of long span applications such as bridges or the like. By providing such beams 10, bridges or similar structure may be constructed using precast concrete beams in accordance with the present invention that allows for longer bridge spans and/or a reduced number of beams to support a particular structure. Each beam is lighter for a particular span length than other available configurations, and with a design that allows for a less complicated installation. Further, the beam geometry facilitates inspection, validation, maintenance and the like.

Figure 11:
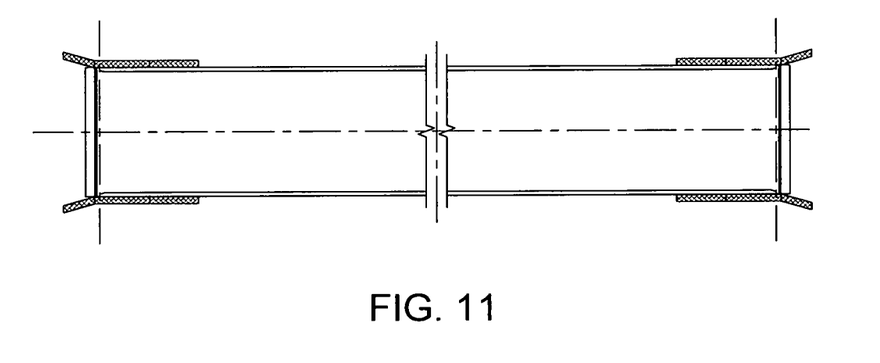
FIG. 11 is a general plan view of a bridge utilizing the beam bridge configuration according to a DIB configuration embodiment of the present invention.
Figure 12:
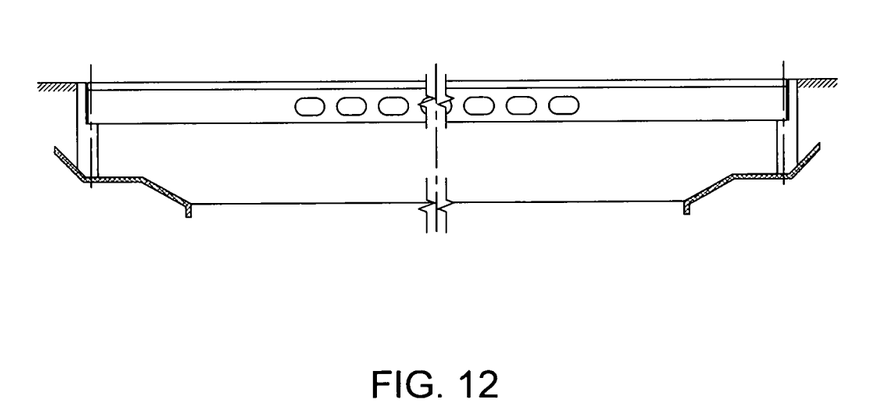
FIG. 12 is an elevational view of the bridge of FIG. 11.
Figure 13:
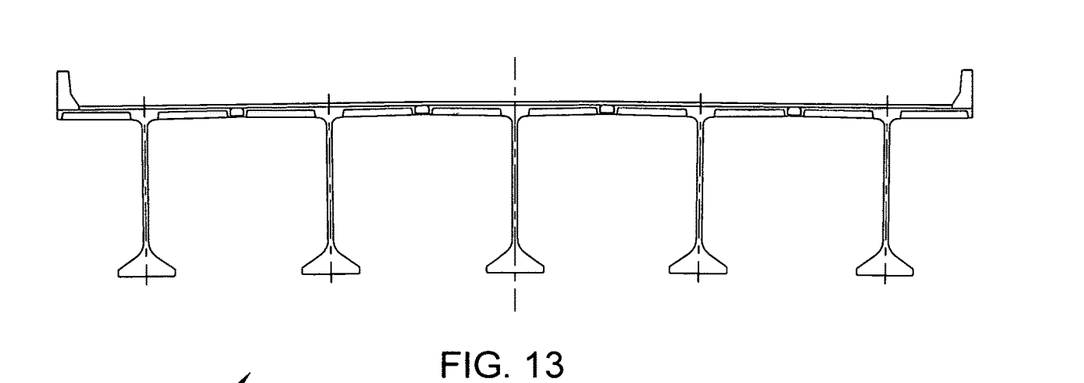
FIG. 13 is an exemplary cross sectional view of a decked I-beam ("DIB") bridge design shown according to the an alternate design of the present invention for a design of a 250-foot span.

An improved precast concrete beam is shown according to an alternate embodiment of the present invention showing a U-beam configuration. Preliminary analysis shows that section configuration as shown is adequate to resist the bending moment demand using approximately (150) 0.7-in, strands in each member. A close-up of the cross-section of the beam is shown in FIG. 10. It was estimated that no. 4 grade 60 hooked bars may be placed in each top bulb at 12-inch spacing to resist the interface shear demand. Such a spacing fits inside the voids of the precast truss panel, allowing for composite connection between the beams and the top slab. Such a deck slab may consists of a 1.5-inch thick precast UHPC layer with two welded wire steel trusses and a 6.5-in. thick CIP conventional concrete (CC) layer that placed at time of construction as shown in FIG. 11.

To further optimize the shape, a middle third of the beam has webs replaced with hollow structural sections ("HSS") steel tubes to reduce the weight of the precast beam. The cross-section of the tub beam, including these steel tubes. The steel tubes are placed as a truss system along the length of the beams. These beams are also subjected to very high prestressing forces at release. To prevent cracking of the member at time of release, steel will need to be added within a distance of h/4. However, the contribution due to the fibers can be accounted for. For the tub beams, approximately twelve no. 7 grade 60 bars are needed at each end, with six bars being in one web and six bars being in the other. The fibers are assumed to be able to carry the rest of the stress. Such a configuration may allow for larger girder systems to be used for a bridge deck, while requiring a fewer number of girders overall. While the larger girders themselves may be larger, heavier and potentially more expensive than conventional girders, the use and installation of a fewer number of girders allows for overall savings in weight, cost and installation time.

Figure 15:
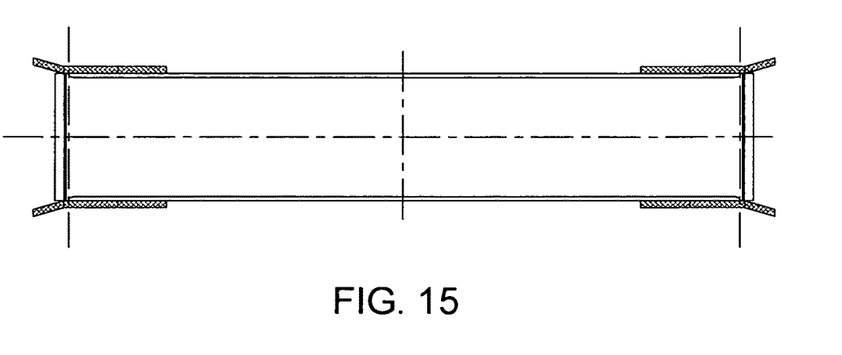
FIG. 15 is a general plan view of a bridge utilizing the beam bridge configuration according to a DIB configuration embodiment of the present alternate invention.
Figure 16:
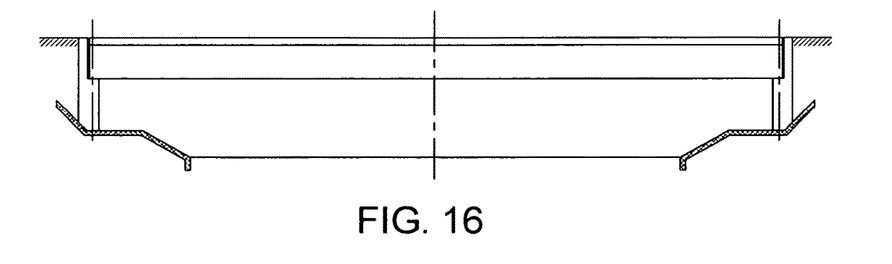
FIG. 16 is an elevational view of the bridge of FIG. 15.
Figure 17:
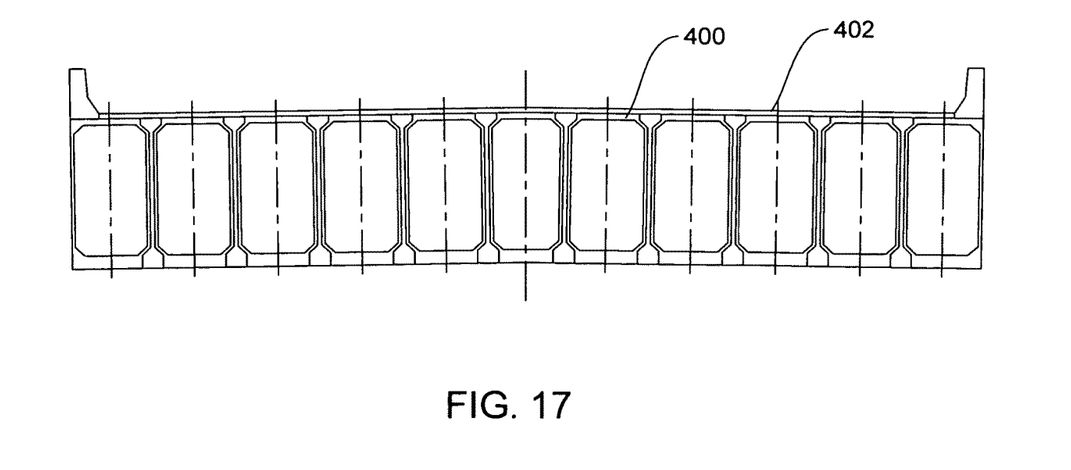
FIG. 17 is a cross section of an adjacent box bridge girder system according to the present invention.

A Decked I-Beam System Design utilizing the present teachings is shown in an exemplary span of 350 feet. Similar to the "U" tub beam, the 350 foot span decked I-beam (DIB) bridge system uses four DIBs that are 12 feet in depth with a beam spacing of 12-ft 8-in. Rather than using a deck slab or the shown composite truss panel, the deck is integrated into the beam, allowing for simple and quick production. The deck is ribbed to save on material costs, as the entire depth is not needed to obtain sufficient strength and resist transverse bending. Bars can be placed transversely in these ribs to provide enough bending strength as well as for a joint connection. The cross-section of the bridge is shown in FIG. 15. Note that the transverse bars are not shown in this section for clarity.

Preliminary analysis shows that the provided section is adequate to resist the bending moment demand using approximately (90) 0.7-in, strands in each member. (24) holes, approximately ⅝-in, in diameter are also provided in the top flange to allow for future post-tensioning of 0.5-in, strands. This allows for camber to be adjusted on site.

A close-up of the cross-section of the beam is shown in FIG. 18. Note the big gap between strands in the center of the beam. This allows for the UHPC mix to be able to flow uninterrupted to the bottom, helping prevent any fiber bridging between center strands. Tentatively, no. 6 grade 60 bars are placed in the top and bottom of each rib to allow for sufficient connection of the beams, as well as to resist any positive and negative bending of the integrated deck.

Figure 19:
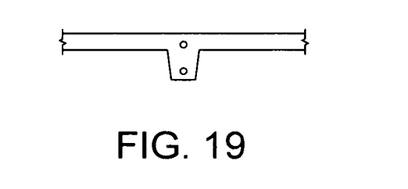
FIG. 19 is a cross sectional view of a transverse rib for use therewith.

The cross-section of the ribs is shown in FIG. 19. To further optimize the shape, the beam would be formed as a truss beam for the middle 60 percent of the length. Triangular shaped voids would be formed using expanded polystyrene (EPS) or similar. This substantially reduces both the weight of the member and the amount of material needed. Previous research and testing of UHPC members did not show any issues with including these large opening, so it is assumed that this detail would not create issues with stress and strength demands. These beams are subjected to very high prestressing forces at release. To prevent cracking of the member at time of release, steel will need to be added within a distance of h/4. However, the contribution due to the fibers can be accounted for. For the decked I-beam, approximately (6) no. 6 grade 60 bars are needed at each end. The fibers are assumed to be able to carry the rest of the stress.

Figure 22:
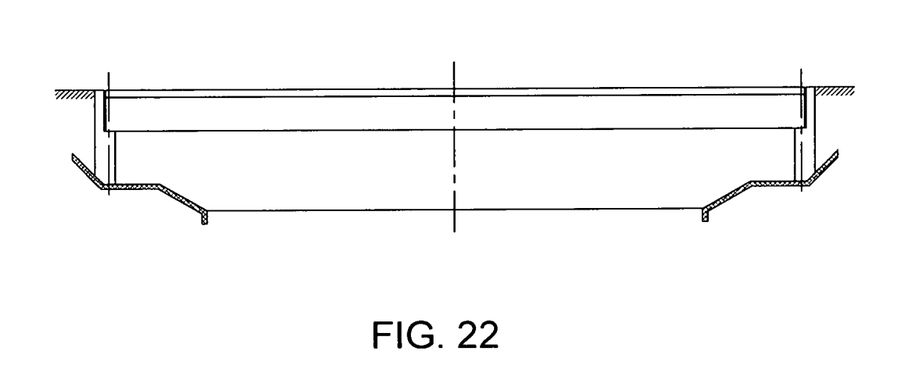
FIG. 22 is a side elevational view thereof.

Placement of the bursting reinforcement should according to existing codes and design guides of the Precast/Prestressed Concrete Institute. Utilizing the teachings of the present invention, possibilities now exist for Long Span Bridges utilizing UHPC or similar concrete mix designs in excess of 220 feet. For the 250' span I-beam, a member has similar framing to that of the 350 ft span design, but the beams are 9 ft deep and approximately 9 ft wide. The cross-section of this beam is shown in FIG. 22. The design of this beam shows that (54) 0.7-in, strands are adequate for this span. Additionally, (26) holes are placed in the top of the member to allow for in-field post-tensioning of 0.5-in. strands so that the camber can be adjusted as needed.

Note that the main difference in the 350 foot span beam and the 250 foot span beam is the joint shape. The joint shape in the 350 ft span shows a joint that is easy to form for field casting where backer rod can be placed in the bottom flanges, while this beam uses a more standard detail. This beam also uses the same ribbed section as shown previously and shown here in FIG. 22 For this section, it is assumed that a no. 6 grade 60 bar will need to be placed in the bottom of each rib, similar to the other DIB (350') CIP Design, but without the top bar. This means that the fibers are relied on to resist the negative bending moment. (6) no. 6 bars would also need to be placed in each end to resist bursting stresses.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents.

What is claimed is:

1. A beam for use in construction of a long span bridge structure comprising:
   a reinforcing member having a geometric configuration selected from a group consisting of: a "U" tub beam with composite deck system; a decked I-beam; and an adjacent box beam;
   said geometric configuration formed of a UHPC mix having:
   an initial compressive strength, $f'_{ci}=10.0$ ksi;
   a compressive strength at service, $f'_c=17.4$ ksi;
   a modulus of elasticity of concrete, $E_c=6500$ ksi;
   a residual rupture stress, $f_{rr}=0.75$ ksi; and
   a concrete unit weight, $w_c=0.155$ kcf; and
   said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer.

2. The beam of claim 1, wherein said plurality of discontinuous fibers each form a reinforcing strand further comprising:
   a diameter of between about 0.5-inch and about 2.0-inches; and
   a length of between about ½ inch to about 5 inches.

3. The beam of claim 2, wherein the reinforcing member further comprises a prestressed beam cast from the UHPC mix as a unitary body.

4. The beam of claim 1, wherein the UHPC mix further comprises a mixture of:
   cement;
   silica flume;
   limestone;
   slag;
   masonry sand;
   water;
   ice;
   a shrinkage reducing admixture; and
   a workability retaining admixture.

5. The beam of claim 4, wherein said cement is selected from a group consisting of:
   Portland cement; and blended cements including mineral admixtures or blends calcium aluminate cements, calcium sulfoaluminate cements, alkali-activated binders, supersulfated slag cements.

6. The beam of claim 4, wherein said ultra high performance concrete mixture further comprises:
   cement at about 24.5% by weight;
   silica flume at about 4.5% by weight;
   limestone powder at about 7.6% by weight;
   slag at about 13.0% by weight;
   masonry sand at about 39% by weight;
   water at about 4% by weight;
   ice at about 4% by weight;
   a shrinkage reducing admixture at less than 2% by weight; and
   a workability retaining admixture at less than 0.5% by weight.

7. The beam of claim 5, wherein said ultra high performance concrete mixture further comprises:
   cement at about 24.5% by weight;
   silica flume at about 4.5% by weight;
   limestone powder at about 7.6% by weight;
   slag at about 13.0% by weight;

masonry sand at about 39% by weight;
water at about 4% by weight;
ice at about 4% by weight;
a shrinkage reducing admixture at less than 2% by weight; and
a workability retaining admixture at less than 0.5% by weight.

8. The beam of claim 2, wherein the UHPC mix further comprises a mixture of:
cement;
silica flume;
limestone;
slag;
masonry sand;
water;
ice;
a shrinkage reducing admixture; and
a workability retaining admixture.

9. The beam of claim 8, wherein said cement is selected from a group consisting of: Portland cement; and blended cements including mineral admixtures or blends calcium aluminate cements, calcium sulfoaluminate cements, alkali-activated binders, supersulfated slag cements.

10. The beam of claim 8, wherein said ultra high performance concrete mixture further comprises:
cement at about 24.5% by weight;
silica flume at about 4.5% by weight;
limestone powder at about 7.6% by weight;
slag at about 13.0% by weight;
masonry sand at about 39% by weight;
water at about 4% by weight;
ice at about 4% by weight;
a shrinkage reducing admixture at less than 2% by weight; and
a workability retaining admixture at less than 0.5% by weight.

11. The beam of claim 9, wherein said ultra high performance concrete mixture further comprises:
cement at about 24.5% by weight;
silica flume at about 4.5% by weight;
limestone powder at about 7.6% by weight;
slag at about 13.0% by weight;
masonry sand at about 39% by weight;
water at about 4% by weight;
ice at about 4% by weight;
a shrinkage reducing admixture at less than 2% by weight; and
a workability retaining admixture at less than 0.5% by weight.

12. The beam of claim 3, wherein the UHPC mix further comprises a mixture of:
cement;
silica flume;
limestone;
slag;
masonry sand;
water;
ice;
a shrinkage reducing admixture; and
a workability retaining admixture.

13. The beam of claim 12, wherein said cement is selected from a group consisting of: Portland cement; and blended cements including mineral admixtures or blends calcium aluminate cements, calcium sulfoaluminate cements, alkali-activated binders, supersulfated slag cements.

14. The beam of claim 12, wherein said ultra high performance concrete mixture further comprises:
cement at about 24.5% by weight;
silica flume at about 4.5% by weight;
limestone powder at about 7.6% by weight;
slag at about 13.0% by weight;
masonry sand at about 39% by weight;
water at about 4% by weight;
ice at about 4% by weight;
a shrinkage reducing admixture at less than 2% by weight; and
a workability retaining admixture at less than 0.5% by weight.

15. The beam of claim 13, wherein said ultra high performance concrete mixture further comprises:
cement at about 24.5% by weight;
silica flume at about 4.5% by weight;
limestone powder at about 7.6% by weight;
slag at about 13.0% by weight;
masonry sand at about 39% by weight;
water at about 4% by weight;
ice at about 4% by weight;
a shrinkage reducing admixture at less than 2% by weight; and
a workability retaining admixture at less than 0.5% by weight.

16. A long span vehicle bridge structure including a plurality of beams according to claim 4.

17. A long span vehicle bridge structure including a plurality of beams according to claim 7.

18. A long span vehicle bridge structure including a plurality of beams according to claim 8.

19. A long span vehicle bridge structure including a plurality of beams according to claim 11.

20. A long span vehicle bridge structure including a plurality of beams according to claim 12.

21. A long span vehicle bridge structure including a plurality of beams according to claim 15.

* * * * *